T. D. STANLEY.
FRICTION TRANSMISSION MECHANISM.
APPLICATION FILED APR. 16, 1913.
1,089,596.
Patented Mar. 10, 1914.
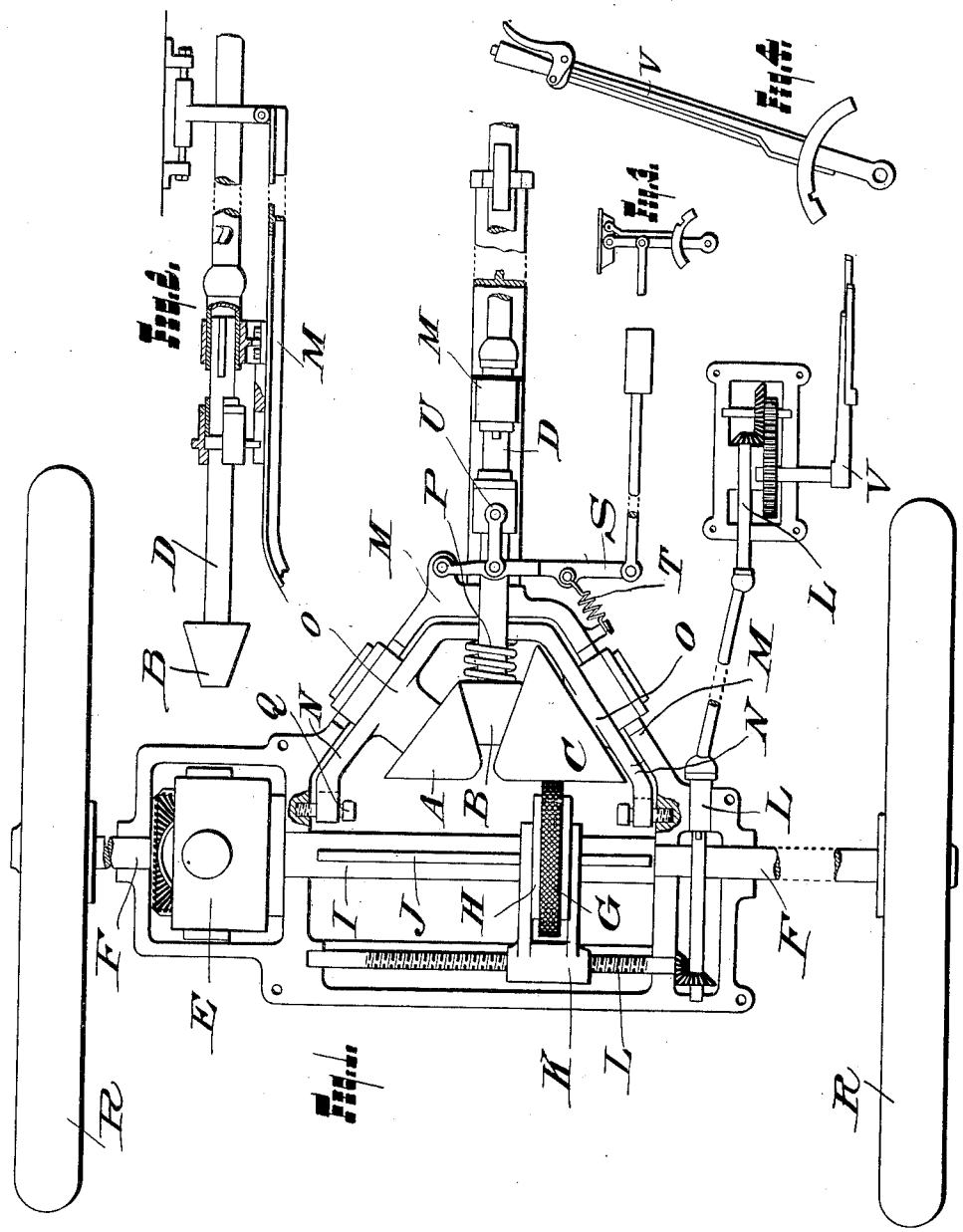

UNITED STATES PATENT OFFICE.

THEODORE D. STANLEY, OF DETROIT, MICHIGAN.

FRICTION TRANSMISSION MECHANISM.

1,089,596.　　　　　　Specification of Letters Patent.　　Patented Mar. 10, 1914.

Application filed April 16, 1913. Serial No. 761,537.

*To all whom it may concern:*

Be it known that I, THEODORE D. STANLEY, a citizen of the United States, residing at Detroit, in the county of Wayne and State of Michigan, have invented a new and useful Friction Transmission Mechanism, of which the following is a specification.

The object of the invention is to equip an automobile, motor truck or other self moving vehicle with a simple and efficient transmission mechanism either of power or speed through friction applied or adjusted as set forth and illustrated by the accompanying drawings.
Figure 1 is a top view of the transmission mechanism (outside cover removed) showing how it is attached to the rear or driving axle of the vehicle and showing the center cone which is firmly attached to the driving shaft which cone when in contact with the two other cones causes them to revolve in opposite directions by friction. Fig. 2 is the power shaft running from the engine or propelling force to the center cone. Fig. 3 shows the lever by which the operator is enabled instantaneously to detach the inner cone from contact with the side cones. Fig. 4 shows the lever which controls the worm at the rear of the axle thereby enabling the operator to increase or reduce the speed to throw off all speed and also to reverse the action of the shaft connecting the drive wheels.

Similar letters refer to similar parts in the several drawings.

The power shaft D (like all shafts of automobiles) must be so constructed as to be capable of contracting and of expanding in length, when necessary, at some point between that designated by the letter U and the motor or driving force. This enables the operator to detach the center cone B from the two side cones so that the said center cone as well as the driving shaft can revolve without affecting or moving such side cones A and C. The power shaft D is supported by a frame work M which at the forward end is attached to the skeleton of the car and at the rear end is supported by the rear axle of the vehicle itself and includes at one end or side thereof the differential gearing E which, though forming no part of the transmission mechanism, is a necessary part thereof in its structure as a whole. The inside case or frame N, to which is attached the two side cones is supported in its middle or center by the power shaft D and at the two ends by bolts Q. These bolts do not hold such frame rigidly but merely from an upward and downward movement, at the same time allowing a free forward and backward motion thus causing by aid of the spring T the cones A and C to be held firmly against the wheel G. The spring P is designed to keep the three cones snugly in contact with each other except when the operator, by pressing his foot upon the pedal, raises the lower end of the power shaft and with it the cone B by aid of the bar S sufficiently to separate such cone from the other cones. The sleeve I which surrounds the rear axle is joined to the main wheel of the differential gearing E. By feathering this sleeve I the wheel G is allowed to be fastened thereto in such a way that the wheel cannot revolve without also revolving the differential gearing attached to said sleeve but such wheel can, by means of the guide K, the worm and connecting rod L and the lever V, be moved at the will of the operator along such sleeve I anywhere between the bases of the twin cones A and C. It will thus be evident that such wheel G, when in contact with the cone C, has a variable speed gradually diminishing as the wheel G moves from the base to the apex of the said cone and in like manner affecting the running speed of the automobile or other self moving vehicle.

Between the two cones A and C is a point where the wheel G comes in contact with no driving force and when such wheel G stands in that position all three of the cones will revolve without causing the vehicle to move either way but when the wheel G comes in contact with the other cone the wheel G will be revolved in the opposite direction from that imparted to it by the other twin cone. These cones A and C must be carefully and accurately mounted so that their supports which must of course be provided with suitable ball bearings do not rest or come in contact with the outer frame work M and the said cones A and C must be so placed that the outer surface thereof farthest distant from the driving motor must be on a line perpendicular to the driving shaft D and also on a line parallel with the said rear axle of the said vehicle and located at such distance from each other that if the lines of their opposite sides were produced such point of contact would fall in the right line already mentioned as formed by their opposite sides parallel with the rear axle. The apex of the cone B, if its sides were produced, should meet at the same point, i. e. where the twin cones meet. Where the diameter of the cone B stands to the other two cones in the ratio of one to two said middle cone will make two revolutions to one of either of the twin side cones. To procure the best results the two side cones should be of hard firm metal while the cone B and the wheel G, in so far as they come in contact with the side cones, should be of some other substance, such as leather, fiber, paper or cork or something of a similar nature which could be easily and inexpensively replaced if necessary.

The drawings presented show the transmission mechanism as adjusted to the rear axle but there is no intention thereby of limiting its being connected to another and independent shaft instead of to the axle itself.

I claim:

1. In an automobile or other self moving vehicle, the friction transmitter consisting of a driving shaft a truncated cone shaped drum on one end thereof, twin cones on opposite sides of said drum means to hold such drum in proper position and also to disengage the same from contact with the faces of the other cones, the extreme outward sides of said twin cones (most remote from said drum) forming a right line, a driven shaft, a movable wheel splined thereto to which the power is to be transmitted, means for controlling such movable wheel, an independent frame to hold and support such cones as well as to allow them to revolve upon their axes and means to keep such frame in proper position so as to give the proper grip to the twin cones against the movable wheel substantially as set forth.

2. In an automobile or other self moving vehicle, for the transmission of power and securing any desired change of speed in such vehicle, a device consisting of three cones standing so that the same plane will bisect the three cones and will produce at the apexes of the three cones angles totaling one hundred and eighty degrees, a driving shaft capable of contraction and expansion attached to the base of the middle cone at its center, means to control such contraction and expansion thereby allowing the middle cone to revolve free from any contact with the other cones or in such close contact therewith as by friction to cause such other cones to revolve when the middle cone revolves, a movable pulley so adjusted that its face may come into contact with any part of the faces of the two outer cones, a shaft whose center is in the same plane as that bisecting the three cones, such shaft standing parallel with the two faces of the outer cones and supporting the movable pulley and splined thereto, spindles upon which the outer cones revolve, a frame holding rigid such spindles and supporting the three cones, means to cause such frame and with it the faces of the outer cones to be moved toward the face of the sliding pulley, all substantially as set forth.

3. In an automobile or other self moving vehicle, for the transmission of power and securing a change of speed, a transmitter comprising a driving shaft, a truncated cone shaped cap attached thereto having a face or surface of some soft substance, twin cones mounted for revolution in contact with the cone shaped cap, means for giving such cap a proper pressure against the other revolving cones or of detaching it from them, a frame to support the twin cones, means to keep the said frame in the desired position, a shaft for receiving the power, a pulley splined to the shaft or axle receiving the transmitted power and means for controlling the position of the said pulley thus causing it to be propelled by the twin cones at any point between the bases of the twin cones along the line of their faces except at or near the apexes thereof but by one cone in the opposite direction to that of the other, all substantially as set forth.

THEODORE D. STANLEY.

Witnesses:
 WM. S. THOMAS,
 M. M. REESE.